(12) United States Patent
Ishibashi et al.

(10) Patent No.: US 6,850,478 B1
(45) Date of Patent: Feb. 1, 2005

(54) OPTICAL DISK MEDIUM AND OPTICAL DISK INDENTIFICATION METHOD AND OPTICAL DISK DEVICE

(75) Inventors: Hiromichi Ishibashi, Osaka (JP); Shigeru Furumiya, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 523 days.

(21) Appl. No.: 10/069,638

(22) PCT Filed: Aug. 31, 2000

(86) PCT No.: PCT/JP00/05944

§ 371 (c)(1),
(2), (4) Date: Feb. 26, 2002

(87) PCT Pub. No.: WO01/18798

PCT Pub. Date: Mar. 15, 2001

(30) Foreign Application Priority Data

Sep. 2, 1999 (JP) .......................... 11/248347

(51) Int. Cl.[7] ............................... G11B 7/00
(52) U.S. Cl. ................. 369/275.3; 369/275.4; 369/47.46; 369/53.2
(58) Field of Search ............ 369/47.1, 47.15, 369/47.28, 47.41, 47.46, 53.1, 53.2, 53.31, 53.41, 59.1, 59.25, 275.1, 275.3, 275.4, 275.5

(56) References Cited

U.S. PATENT DOCUMENTS 6,337,839 B1 * 1/2002 Nakane et al. ............ 369/275.3

FOREIGN PATENT DOCUMENTS

| EP | 0 694 920 A2 | 1/1996 |
|----|--------------|--------|
| JP | 05-067335 | 3/1993 |
| JP | 09-055016 | 2/1997 |
| WO | 97/15050 | 4/1997 |

OTHER PUBLICATIONS

International Search Report, Application No. PCT/JP00/05944, dated Jan. 16, 2001.

* cited by examiner

Primary Examiner—Muhammad Edun
(74) Attorney, Agent, or Firm—Renner, Otto, Boisselle & Sklar, LLP

(57) ABSTRACT

The reproduction-only disk medium of the present invention includes preformed first information, in which the first information is formed in the same format as second information recorded on a prescribed recordable disk medium; and a direction along which the first information is formed on the reproduction-only disk medium is opposite to a direction along which the second information is recorded on the prescribed recordable disk medium.

17 Claims, 9 Drawing Sheets

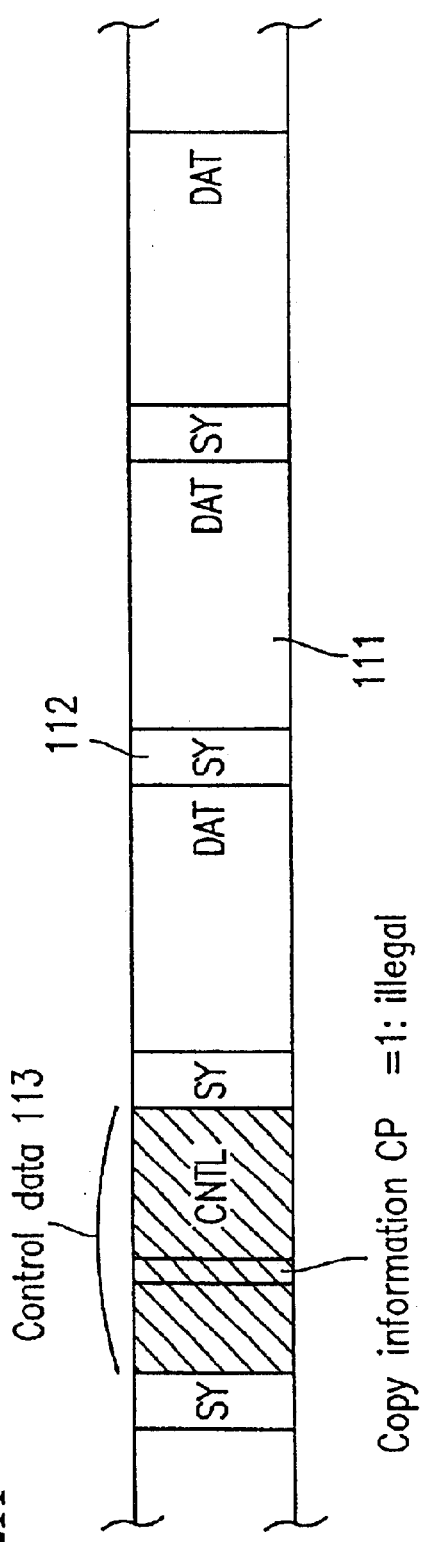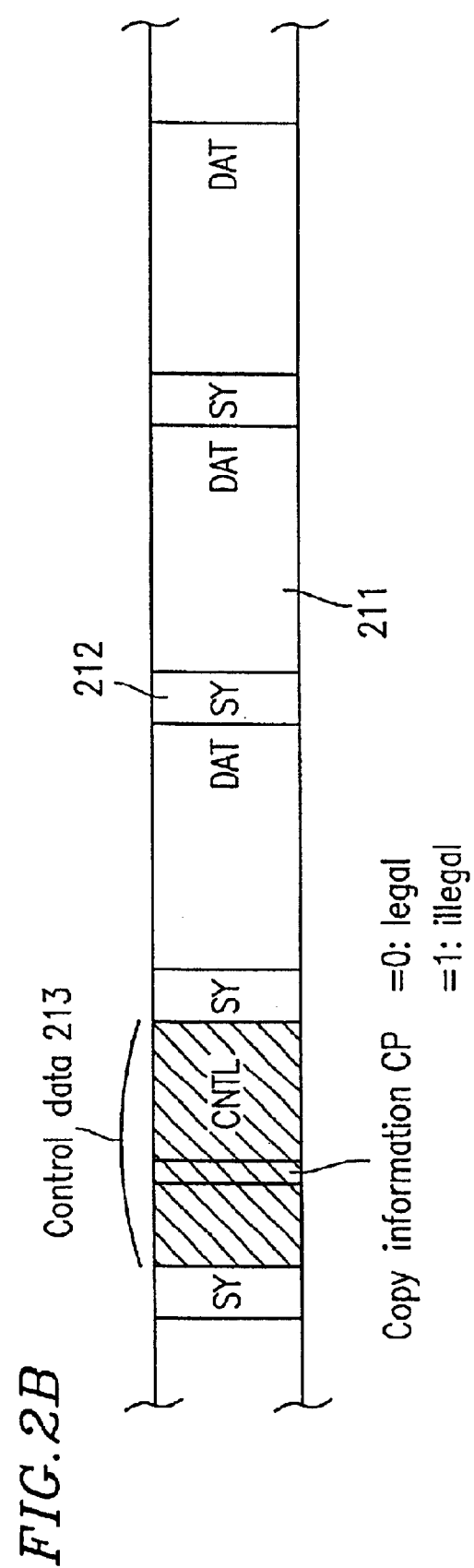

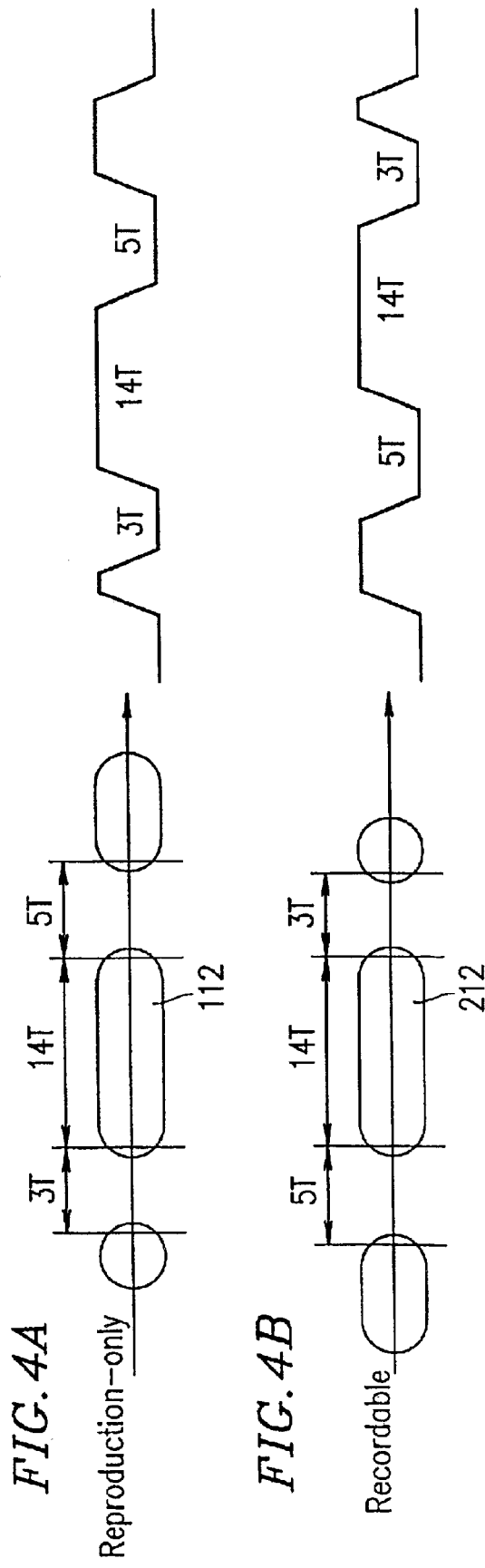

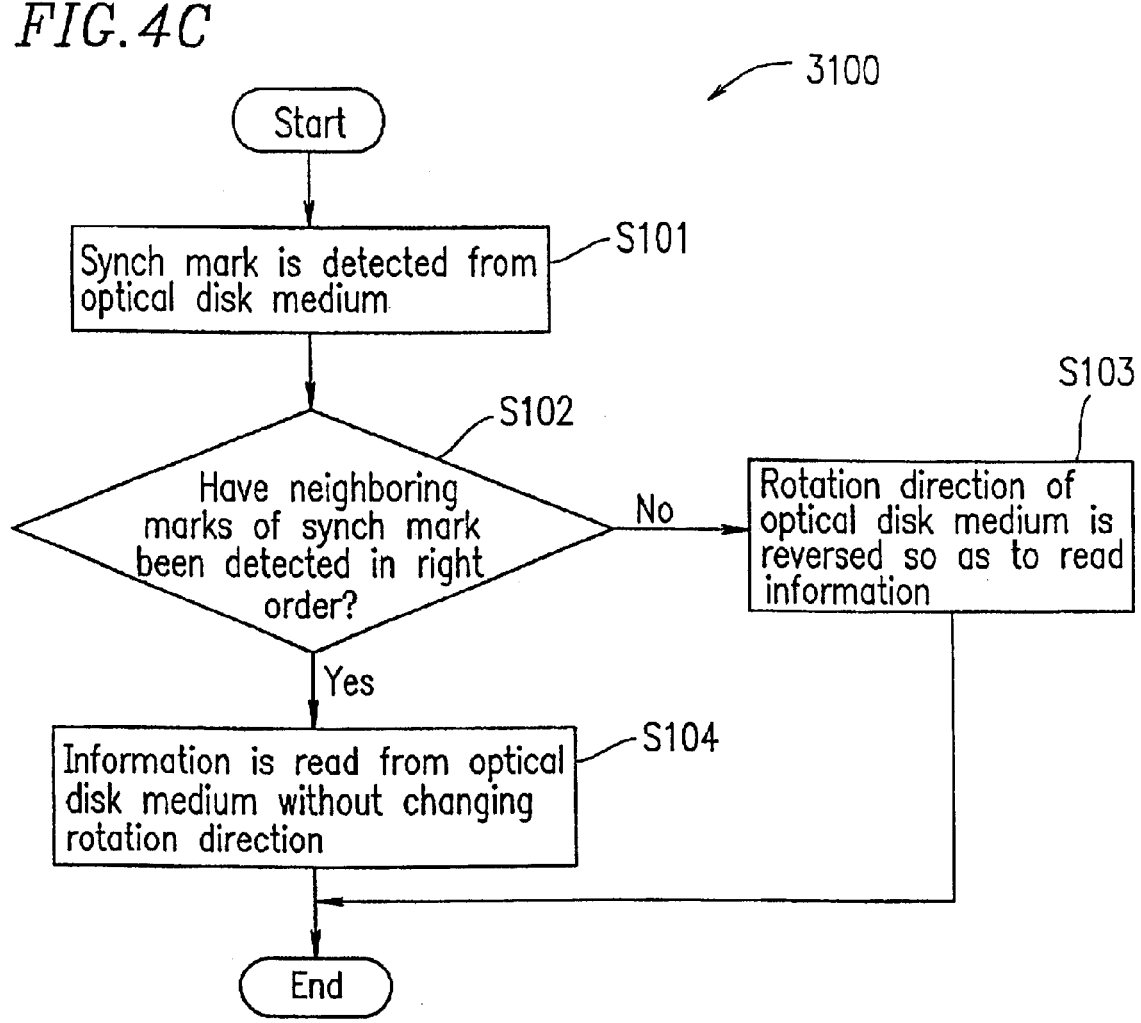

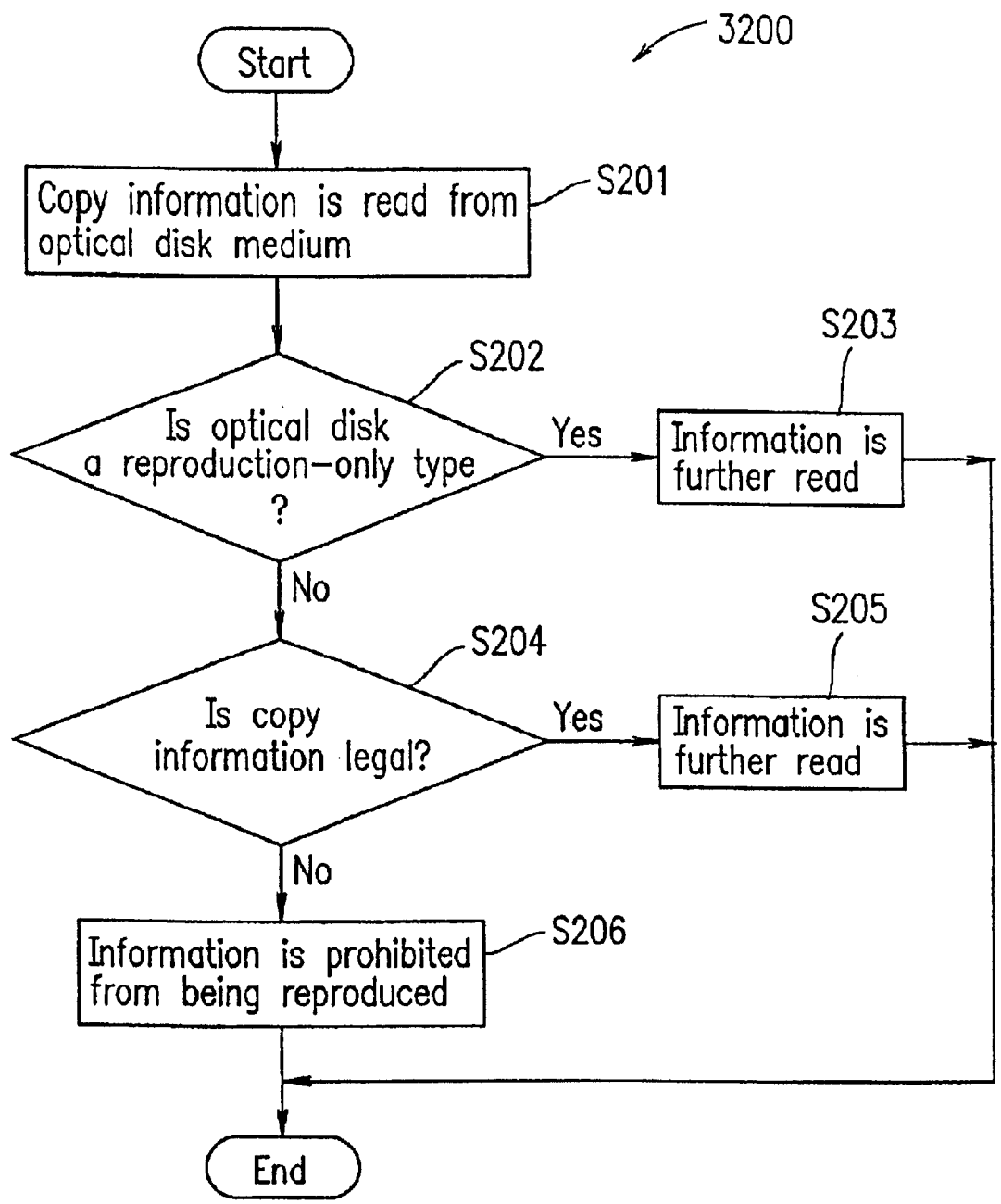

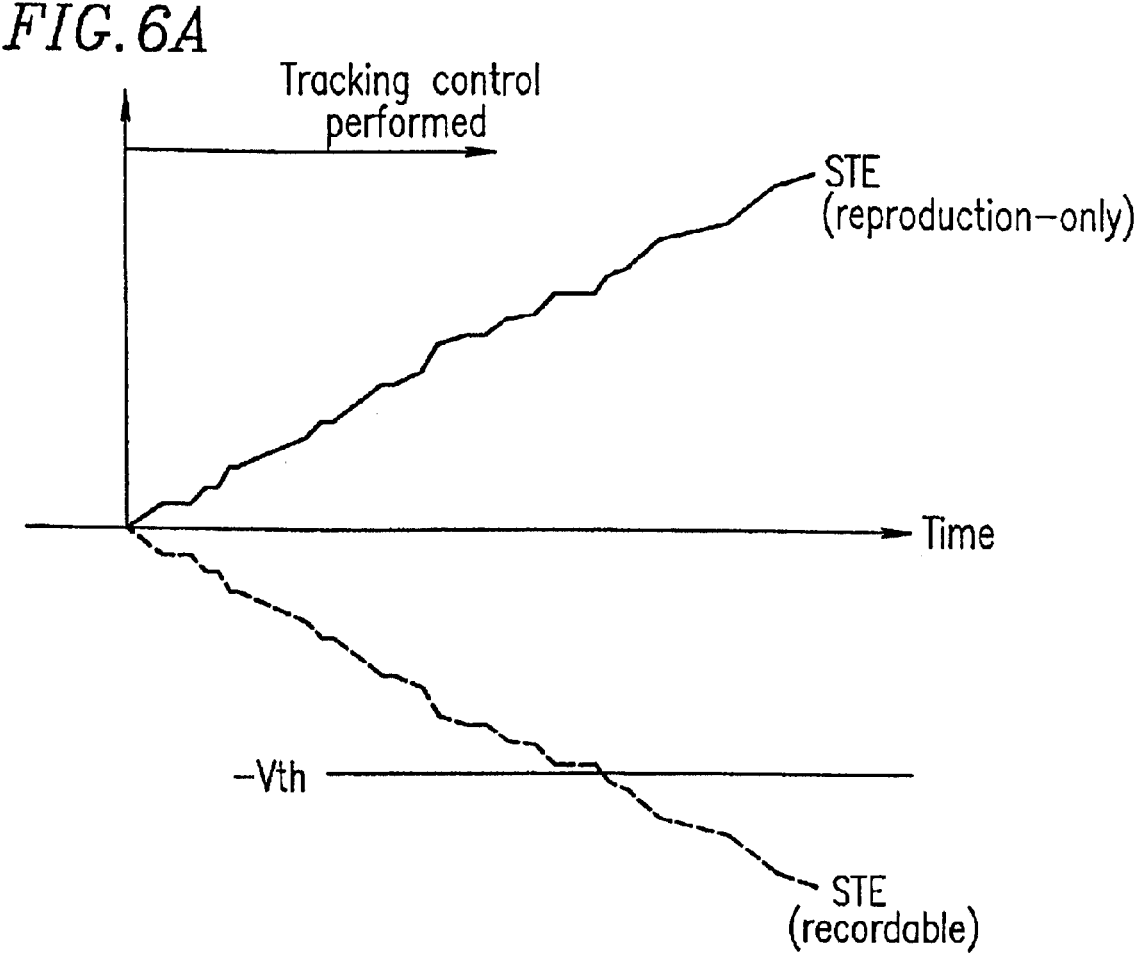

OPTICAL DISK MEDIUM AND OPTICAL DISK INDENTIFICATION METHOD AND OPTICAL DISK DEVICE

TECHNICAL FIELD

The present invention relates to optical disk media having the same form which can be classified into two types, such as a CD and a CD-R (i.e., a medium of a reproduction-only type and a medium of a recordable type to which information can be added, respectively). The present invention also relates to a method for identifying an optical disk with respect to whether the optical disk is of a reproduction-only type or a recordable type, and to an optical disk apparatus for performing at least a reproduction process on the optical disk medium.

BACKGROUND ART

In recent years, optical disks have been used in a variety of applications, such as recording or storing of images, sounds, or information. In particular, a recordable optical disk is expected to be used in applications, such as authoring of video or audio contents (i.e., a trial piece for mass production), or it is expected to be used as a medium on which a general user can record audio or video information.

It is preferred that the recordable optical disk has the same form as that of a reproduction-only optical disk, as in the case of a CD-R, i.e., the format of information recorded on a CD-R is the same as the format of information stored on a reproduction-only CD. The reason for this is that when the recordable optical disk and the reproduction-only optical disk use the same format, information recorded on the recordable optical disk can be reproduced by using a reproduction-only optical disk apparatus (e.g., a CD player) as it is.

This is not only a matter of cost of the optical disk apparatus but also a matter of importance to enhancement of content popularity. Specifically, the reproduction-only optical disk, such as a CD, has information pits preformed in a substrate thereof and such pits are usually formed by injecting resin into a die under high pressure. Accordingly, production facilities are large in scale, and thus the optical disks are supposed to be mass-produced.

On the other hand, the recordable optical disks, such as CD-Rs, are suitable for being produced in small quantities for various kinds of products. By using the same format for both the recordable optical disk and the reproduction-only optical disk, the optical disk apparatus can treat the recordable optical disk as a reproduction-only optical disk so as to reproduce information on the recordable optical disk, whereby it is possible to achieve quick adaptability to the diversity in the market.

In the case where an optical disk is used for authoring, even if system performance is verified using a recordable optical disk, when the format for reproduction-only optical disks to be mass-produced is different from that for the recordable optical disk, the same system performance cannot always be obtained. Thus, it is preferred that the reproduction-only disk and the recordable disk have the same format when being used for authoring.

However, when the same format is used for both the reproduction-only disk and the recordable disk for the aforementioned reasons, there arises a copyright problem. Specifically, it is possible to reproduce digital information on the reproduction-only disk so as to read the digital information bit-by-bit and sequentially record the digital information on the recordable disk (i.e., it is possible to make a so-called bit-by-bit copy), whereby the reproduction-only disk can be readily copied.

Thus, various kinds of disk format have been conventionally devised for the purpose of copyright protection. For example, Japanese Laid-Open Patent Publication No. 5-266576 discloses that when information is legally recorded (copied) on a disk, an invalid sector (a defect sector) is purposely provided on the disk. By applying this technology, it is possible to identify whether or not a target disk has been illegally copied from a reproduction-only disk, since no defect sector can be initially present on the reproduction-only disk. Moreover, Japanese Laid-Open Patent Publication No. 10-302404 discloses a method for preventing a bit-by-bit copy by cutting off a spiral groove preformed in a recordable disk in suitable places.

However, the aforementioned technologies are based on a premise that the reproduction-only disk and the recordable disk have different formats from each other.

The present invention has been made in view of the above problems and aims to provide: an optical disk medium which makes it possible to readily identify an illegal bit-by-bit copy even when both a reproduction-only disk and a recordable disk have the same format; a method for identifying an optical disk: and an optical disk apparatus.

DISCLOSURE OF THE INVENTION

A reproduction-only disk medium of the present invention includes preformed first information, the first information is formed in the same format as second information recorded on a prescribed recordable disk medium, and a direction along which the first information is formed on the reproduction-only disk medium is opposite to a direction along which the second information is recorded on the prescribed recordable disk medium, and therefore the above described objective is achieved.

Third information, which represents that the first information is illegal, may be preformed on the reproduction-only disk medium.

The first information may be formed according to a prescribed modulation rule; fourth information, which has a first mark having a code length other than that created according to the prescribed modulation rule, may be preformed on the reproduction-only disk medium; and a second mark and a third mark respectively having a different prescribed code length may be formed so as to be adjacent the first mark.

The first information may be formed along a first spiral direction of a spiral first track on the reproduction-only disk medium, and the first spiral direction may be opposite to a second spiral direction of a spiral second track on the prescribed recordable disk medium on which the second information is recorded.

A recordable disk medium of the present invention is a recordable disk medium on which first information is recorded, the first information is recorded in the same format as second information preformed on a prescribed reproduction-only disk medium and a direction along which the first information is recorded on the recordable disk medium is opposite to a direction along which the second information is formed on the prescribed reproduction-only disk medium, and therefore the above described objective is achieved.

The recordable disk medium may include a region in which third information is recorded representing whether the first information is legal or illegal.

The first information may be recorded according to a prescribed modulation rule; fourth information, which has a first mark having a code length other than that created according to the prescribed modulation rule, may be recorded on the recordable disk medium; and a second mark and a third mark respectively having a different prescribed code length may be recorded so as to be adjacent the first mark.

The first information may be recorded along a first spiral direction of a spiral first track on the recordable disk medium; and the first spiral direction may be opposite to a second spiral direction of a spiral second track on the prescribed reproduction-only disk medium on which the second information is formed.

An optical disk apparatus of the present invention reproduces at least first information or second information from a reproduction-only disk medium on which the first information is preformed or a recordable disk medium on which the second information is recorded, the optical disk apparatus includes: a motor for rotating the reproduction-only disk medium or the recordable disk medium; and a motor drive section for controlling the motor, a rotation direction during reproduction of the reproduction-only disk medium is different from a rotation direction during reproduction of the recordable disk medium, and therefore the above described objective is achieved.

A first spiral direction of a spiral first track on the reproduction-only disk medium on which the first information is formed may be opposite to a second spiral direction of a spiral second track on the recordable disk medium on which the second information is recorded; and the optical disk apparatus may further include a disk type identification section for identifying the reproduction-only disk medium and the recordable disk medium from the first spiral direction or the second spiral direction.

The optical disk apparatus may further include a rotation direction switching section for switching a rotation direction of the motor according to the first spiral direction or the second spiral direction.

The reproduction-only disk medium may include preformed third information which represents that the first information is illegal; and during reproduction of the reproduction-only disk medium, the third information may be ignored by the optical disk apparatus.

The reproduction-only disk medium may include preformed fourth information representing the first spiral direction: the recordable disk medium may include preformed fifth information representing the second spiral direction; and a direction identification section may identify the first spiral direction and the second spiral direction based on the fourth information and the fifth information.

A disk medium identification method for identifying a reproduction-only disk medium of the present invention includes a plurality of pits preformed along a first spiral direction of a spiral first track and a recordable disk medium on which information can be recorded along a second spiral direction of a spiral second track opposite to the first spiral direction, the method includes the steps of: performing tracking control by rotating a prescribed disk along a prescribed direction; integrating a tracking error signal created when performing the tracking control; and identifying the reproduction-only disk medium and the recordable disk medium according to a polarity of the integrated tracking error signal, and therefore the above described objective is achieved.

A disk medium identification method for identifying a reproduction-only disk medium of the present invention includes a plurality of pits preformed along a first spiral direction of a spiral first track and a recordable disk medium on which information can be recorded along a second spiral direction of a spiral second track opposite to the first spiral direction, the method includes the steps of: detecting a first signal from a prescribed disk when the prescribed disk is rotated along a prescribed direction; and identifying the reproduction-only disk medium and the recordable disk medium based on the first signal, and therefore the above described objective is achieved.

The first signal may include at least a second signal having a first code length, a third signal having a second code length, and a fourth signal having a third code length, the code lengths being different from one another.

The step of identifying may include identifying the reproduction-only disk medium and the recordable disk medium according to at least an order in which the second signal, the third signal, and the fourth signal are reproduced.

BRIEF DESCRIPTION OF THE DRAWINGS

FIG. 2A is a schematic diagram illustrating part of an optical disk medium according to Example 1 of the present invention.

FIG. 2B is a schematic diagram illustrating part of another optical disk medium according to Example 1 of the present invention.

FIG. 4A is a diagram explaining an operation according to Example 2 of the present invention.

FIG. 4B is a diagram explaining another operation according to Example 2 of the present invention.

FIG. 4C is a flowchart illustrating a spiral direction detection method according to Example 2 of the present invention.

FIG. 4D is a flowchart illustrating an illegal copy detection method according to Example 2 of the present invention.

FIG. 6A is a graph explaining an operation according to Example 3 of the present invention.

BEST MODE FOR CARRYING OUT THE INVENTION

Example 1

Hereinafter, optical disk media according to Example 1 of the present invention will be described with reference to the drawings. The optical disk media according to Example 1 are classified into two types, i.e., a reproduction-only type and a recordable type. Structures of these two types of optical disk media are respectively shown in FIGS. 1A and 1B.

Figure 1A:
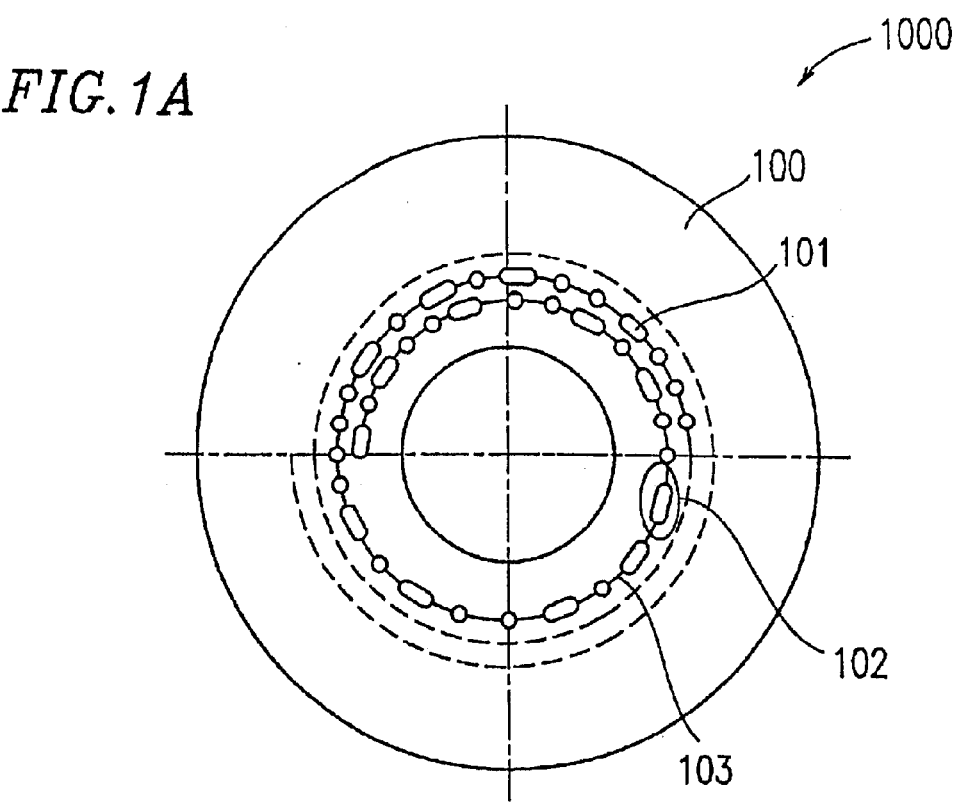
FIG. 1A is a diagram illustrating a structure of an optical disk medium according to Example 1 of the present invention.

FIG. 1A illustrates an optical disk medium 1000 of a reproduction-only type. The optical disk medium 1000 includes a substrate 100 with information marks 101 and synch marks 102 provided along a spiral track center line 103. The information marks 101 and synch marks 102 are respective concave and convex formed by pits and spaces. The track center line 103 as described herein does not actually exist as a line on the disk surface as shown in FIG. 1A, rather it is virtually depicted. In other words, the track center line 103 runs through the center of a group of spirally formed information pits.

Figure 1B:
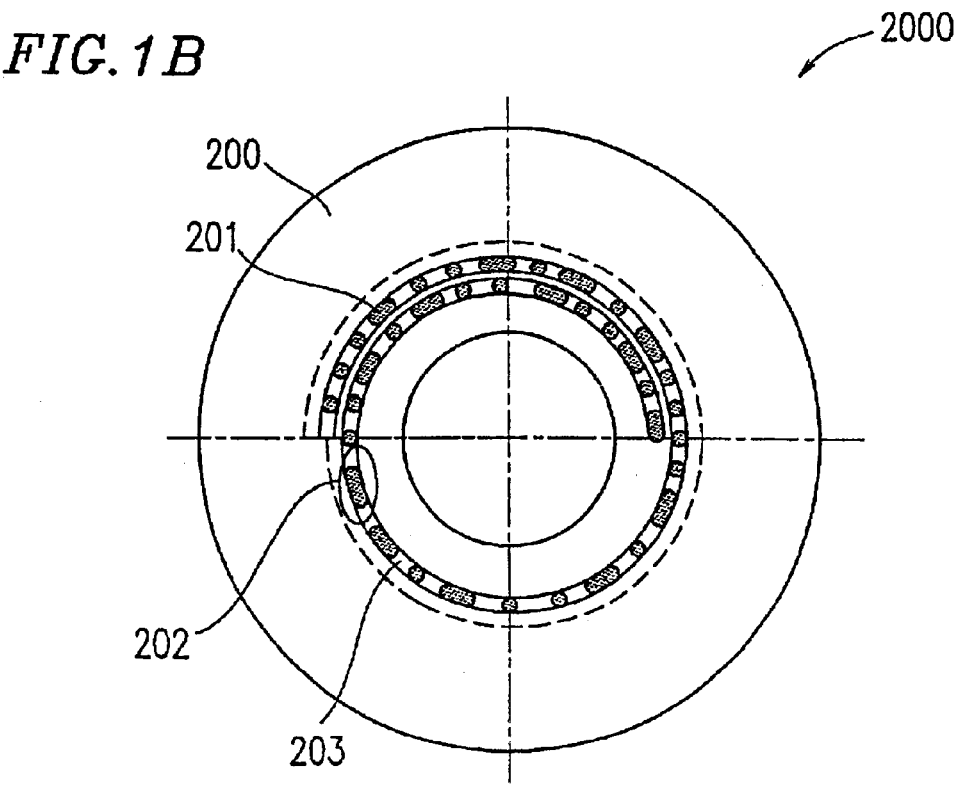
FIG. 1B is a diagram illustrating a structure of another optical disk medium according to Example 1 of the present invention.

FIG. 1B illustrates an optical disk medium 2000 of a recordable type. The optical disk medium 2000 includes a substrate 200 with a spiral track groove 203. Information marks 201 and synch marks 202 are included in the track groove 203. Although not shown, on the track groove 203, there is a preformed recording layer in which information can be written or rewritten (hereinafter, "record" is used instead of "write" or "rewrite"), and optical characteristics of the recording layer, such as a reflection coefficient, are changed by photothermal means, as in the case of a phase change film.

The optical disk medium 1000 of a type shown in FIG. 1A and the optical disk medium 2000 of a type shown in FIG. 1B are characterized in that information preformed on the optical disk medium 1000 and information to be recorded on the optical disk medium 2000 use the same recording form, i.e., format. The format as described herein means a common standard regarding recording and reproduction procedures, such as modulation and demodulation methods (e.g., 8–16 modulation for DVD applications), an error correction method, etc. When the same format is used, at least information stored on an optical disk can be reproduced regardless of whether the disk is a reproduction-only type or a recordable type.

However, as described above, when the reproduction-only optical disk and the recordable optical disk have the same format, it is extremely easy to illegally copy the reproduction-only optical disk, thereby causing the copyright for information formed or recorded on the optical disk to be improperly protected.

Therefore, in Example 1 of the present invention, as shown in FIGS. 1A and 1B, the polarity of a spiral track provided in the optical disk medium of a reproduction-only type is opposite the polarity of the spiral track provided in the optical disk medium of a recordable type. By applying these structures, firstly, it is possible to identify the type of the optical disk medium, and it is also possible to identify whether or not making a copy of the optical disk medium is legal, as will be described below in detail. A legality detection method will now be described with respect to the case where the type of the optical disk medium has been identified.

FIGS. 2A and 2B schematically illustrate structural examples of information groups formed or recorded on the optical disk media 1000 and 2000 according to a prescribed format.

The aforementioned information groups include: user data DAT111 or DAT211 (respectively corresponding to the information mark 101 of FIG. 1A and the information mark 201 of FIG. 1B) in which normal data (e.g., a digital image, etc.) is formed or recorded; control data CNTL113 or CNTL213 in which management information or the like is formed or recorded; and synch marks 112 or 212 (respectively corresponding to the synch mark 102 of FIG. 1A and the synch mark 202 of FIG. 1B).

Moreover, copy information CP is included in control data CNTL113 and CNTL213. For example, when recording any information on a recordable optical disk medium with permission, CP=0 (legal recording) is recorded on the optical disk medium. Specifically, when an information provider supplies a receiver with digital TV images via a communication line or the like, the information provider sends, according to a payment, information representing whether or not recording is permitted to the receiver. When recording is permitted, the receiver records CP=0 on the optical disk medium. When recording is prohibited, the receiver records CP=1 (illegal recording) on the optical disk medium. Once reproducing information from an optical disk medium on which information representing recording prohibition has been written is prohibited based on a standard, any information recorded without permission cannot be reproduced.

In this case, since the provider of the recording information can control a recording apparatus, the prohibition of an illegal copy can be achieved in a relatively easy manner. However, when illegally copying information bit-by-bit from the reproduction-only optical disk onto the recordable optical disk medium, there are no measures to prohibit copying, whereby a copied medium can be readily produced.

Thus, in Example 1 of the present invention, copy information CP=1 representing that the disk has been produced by illegal copy is preformed on the optical disk medium 1000 of a reproduction-only type. In this case, information representing illegality is recorded on each optical disk medium 2000 produced by coping information on the optical disk medium 1000 bit-by-bit, whereby reproducing information copied to the optical disk medium 2000 is prohibited.

Since the reproduction-only optical disk medium 1000 prestores the information representing "illegality", any information stored on this reproduction-only optical disk medium 1000 can be prohibited from being reproduced. However, in the case of reproducing information on an optical disk medium, when the optical disk medium can be identified as being either a reproduction-only type or a recordable type, the information representing "illegality" stored on the reproduction-only optical disk medium 1000 can be ignored so as to reproduce other information stored thereon.

Therefore, when reproducing information on an optical disk medium, there is a need for a means for identifying whether the optical disk medium is a reproduction-only type or a recordable type. In Example 1, by providing spiral tracks in the optical disk medium of a reproduction-only type and the optical disk medium of a recordable type such that directions of the spiral tracks are opposed to each other, it is possible to identify both types of optical disk media. An identification method will be described in detail below.

Example 2

Figure 3:
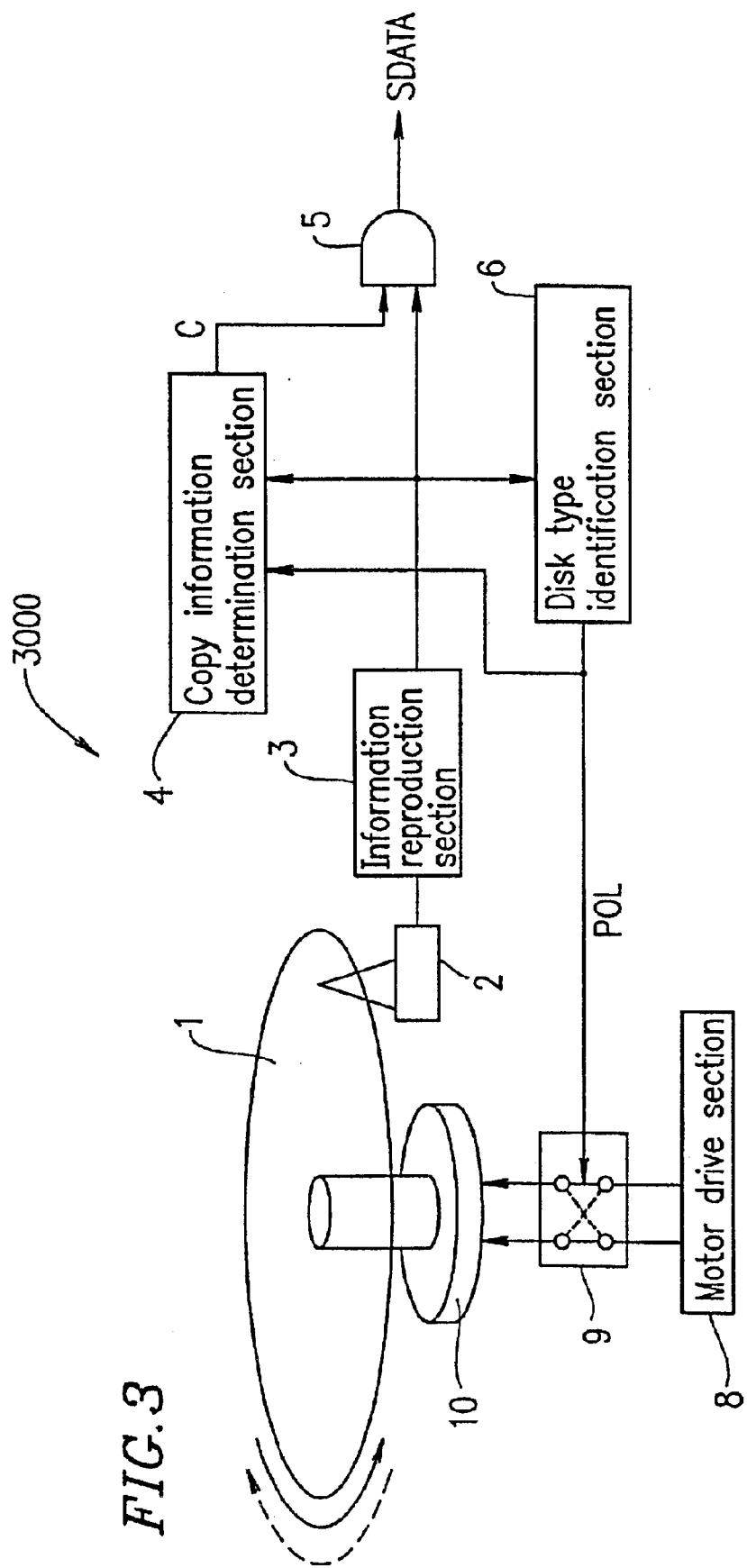
FIG. 3 is a block diagram of an optical disk apparatus according to Example 2 of the present invention.

FIG. 3 is a block diagram of an optical disk apparatus 3000 according to Example 2 of the present invention. In the optical disk apparatus 3000, an optical disk medium 1 is placed so as to be rotated along a prescribed direction by a disk motor 10. The optical disk medium 1000 shown in FIG. 1A or the optical disk medium 2000 shown in FIG. 1B is used as the optical disk medium 1. An optical head 2 reads information formed or recorded on the optical disk medium 1, and an information reproduction section 3 reproduces information data according to a reproduction signal obtained from the optical disk medium 1.

Specifically, the information reproduction section 3 includes, for example, a signal binarizing circuit and a PLL circuit (not shown). The information reproducing section 3 transforms the reproduction signal into a binary pulse signal, and then creates a synchronizing clock so as to create synchronized information data using the synchronizing clock. A disk type identification section 6 identifies a direction of a spiral track provided on the optical disk medium 1 so as to identify whether the optical disk medium 1 is a reproduction-only type or a recordable type. An example of a spiral direction detection method will be described with reference to FIGS. 1A through 4B.

In the structural examples of information groups shown in FIGS. 2A and 2B, the synch marks (denoted by SY in the figures) 112 or 212 are inserted every other data block based on the format. A synch mark as described herein is used for tracking down the beginning of data, i.e., the synch mark is used for indicating a boundary between data blocks and realizing data synchronization. In general, a code which cannot exist in normal data is used as the synch mark. For example, in the case of DVD format, 8–16 modulated normal data is limited to a code length of 3T to 11T (T: channel clock length). In such a format, by defining, as a synch mark, a mark longer than the longest mark (11T) of the normal data, e.g., a code including a mark having a length of 14T, it is possible to readily distinguish the synch mark from other data.

A spiral direction detection method according to Example 2 will now be described with reference to FIGS. 4A and 4B, and a flowchart 3100 shown in FIG. 4C.

In Example 2, as shown in FIGS. 4A and 4B, the optical disk medium 1 includes a (pit) mark having a length of 14T and (space) marks which are provided before and after the (pit) mark and have different lengths (3T and 5T). In this setting, by detecting the mark having a length of 14T when reproducing information on the optical disk medium 1, it is possible to identify a synch mark (step S101 shown in FIG. 4C). Moreover, by sensing the order in which the marks adjacent the synch mark have been detected (step S102), it is possible to identify a spiral direction of the optical disk medium 1, so that the type of the optical disk medium 1 can be identified.

Specifically, a spiral track formed on the optical disk medium 2000 of a recordable type has a direction opposite to that of the spiral track formed on the optical disk medium 1000 of a reproduction-only type. Accordingly, in the case of recording information on the optical disk medium 2000 of a recordable type, the disk motor is naturally required to rotate in an opposite way with respect to the case of reproducing information on the optical disk medium 1000 of a reproduction-only type. The same applies to the case of reproducing information on the optical disk medium 2000. In other words, when the optical disk medium 2000 is rotated along the same direction as in the case of the optical disk medium 1000 so as to reproduce information on the optical disk medium 2000, as can be seen from FIGS. 4A and 4B, a reproduction direction of the information on the optical disk medium 2000 is opposite to a reproduction direction of the information on the optical disk medium 1000. Specifically, although information should be reproduced in the order of 3T, 14T and 5T in the proper manner, information is reproduced in the order of 5T, 14T and 3T, and thus the optical disk medium 1 is determined to be the optical disk medium 2000. When information is reproduced in the order of 5T, 14T and 3T, a rotation direction of the optical disk medium 1 is reversed (step S103 shown in FIG. 4C). When information is reproduced in the order of 3T, 14T and 5T, information is further read from the optical disk medium 1 without changing the rotation direction of the optical disk medium 1 (step S104).

As described above, by providing the marks having different lengths so as to be adjacent the identifiable mark having a length of 14T, and sensing the reproduction order of these marks using the disk type identification section 6 (FIG. 3), a signal reproduction direction, i.e., a spiral direction can be found, and thus the type of the optical disk medium 1 can be identified.

Next, an illegal copy detection method will be described with reference to a flowchart 3200 shown in FIG. 4D. The illegal copy detection method is performed after the type (spiral direction) of the disk is determined in the above-described manner.

In Example 2, when the spiral direction is identified, a polarity switching signal POL (FIG. 3) is sent to a polarity switching section 9. The polarity switching section 9 is provided between the disk motor 10 and a motor drive section 8 which supplies a drive current to the disk motor 10. The polarity switching section 9 switches a direction of the current supplied to the disk motor 10 according to the polarity switching signal POL. For example, when reproducing information on the optical disk medium 1000 of a reproduction-only type along the right direction, the polarity switching signal POL is POL=0, and when reproducing information on the optical disk medium 2000 of a recordable type along the same direction, the polarity switching signal POL is POL=1. The polarity switching section 9 performs a crossbar operation according to the signal. When the current direction is switched by this operation, the rotation of the disk motor 10 is reversed. The above-described series of processes realize information reproduction regardless of the type of the optical disk medium.

When information is read along the proper direction by an optical head, the information reproduction section 3 performs an information reproduction process based on the format shown in FIG. 2A or 2B. During this process, copy information CP is reproduced (step S201 shown in FIG. 4D).

Next, whether the optical disk medium 1 is the optical disk medium 1000 of a reproduction-only type or the optical disk medium 2000 of a recordable type is determined based on the results of the method depicted in the flowchart of FIG. 4C (step S202).

In the case where the optical disk medium 1 is the optical disk medium 1000 of a reproduction-only type, as described above, although all the optical disk media 1000 of a reproduction-only type include CP=1 (information representing illegality), when the copy information detection section 4 identifies a spiral direction of the optical disk medium 1 and determines that information on the optical disk medium 1000 of a reproduction-only type is reproduced (POL=0), the information representing illegality is ignored. At this time, the copy information detection section 4 outputs an output C=0 (legal) and information is further read (step S203).

On the other hand, in the case where the optical disk medium 2000 of a recordable type is reproduced, the disk type identification section 6 outputs POL=1. In this case, the copy information detection section 4 outputs the copy information as it is. Specifically, when information recorded on the optical disk medium 2000 has been recorded through an illegal procedure, C=0 is output, and when it has not been through the illegal procedure, C=1 is output (step S204).

A gate 5 (FIG. 3) determines, based on the output C from copy information determination section 4, whether or not to output a reproduction signal SDATA. In Example 2, when C=0, the reproduction signal SDATA is output (step S205), and when C=1, the reproduction signal SDATA is prohibited from being output (step S206).

As described above, according to Example 2 of the present invention, by preforming information representing a history that information has been illegally copied on the optical disk medium 1000 and also forming a spiral track on the optical disk medium 2000 of a recordable type so as to have a direction opposite to that of a spiral track formed on the optical disk medium 1000 of a reproduction-only type, it is possible to accurately identify both type of the optical disk media, and it is also possible to readily identify illegally copied information.

Moreover, according to Example 2 of the present invention, even if information on the optical disk medium 1000 of a reproduction-only type is copied bit-by-bit on the optical disk medium 2000 of a recordable type, which has the same format as the optical disk medium 1000, the illegality of the disk can be readily identified and reproducing the illegal disk can be prohibited, whereby copyright protection can be achieved.

It should be noted that the term "same format" as described in Example 2 of the present invention is not limited to a meaning of exactly the same form, and in view of the spirit of the present invention, it includes any format for a disk of a recordable type which appears to a reproduction-only optical disk drive as if the format is practically the same as a format for a disk of a reproduction-only type.

For example, there are some cases where the disk of a recordable type has a physical address in addition to the format for a disk of a reproduction-only type. The physical address refers to address information preformed on the disk of a recordable type. When the disk is in an initial state, i.e., nothing has been recorded on the disk yet, the physical address is used as an index for recording information. In this case, strictly speaking, the format for the disk of a recordable type is different from that for the disk of a reproduction-only type. However, in the case where a reproduction-only optical disk apparatus reproduces information on the disk of a recordable type, when the reproduction-only optical disk apparatus is simply set so as to ignore the physical address, the format for the disk of a recordable type can be substantially same as that for the disk of a reproduction-only type.

Moreover, in view of the spirit of the present invention, both types of disks, which have their respective spiral tracks opposing each other, have the same format. For example, one of the reasons why both types of the disks should have the same format is that, in the case where the disk of a recordable type is used as an authoring disk, if the disk of a recordable type does not have the same format as that of the disk of a reproduction-only type which is a disk to be a final product, as described above, system performance cannot be satisfactorily verified. However, in Example 2, it is not conceivable that reversing a rotation direction of an optical disk affects system performance. Moreover, in the case where a general user uses a "reproduction-only disk" produced, in view of production in small quantities for various kinds of products, in such a manner that a manufacturer records information on a disk of a recordable type, it is not conceivable that there is a difference in reproduction performance between a mass-produced reproduction-only disk and the disk of a recordable type due to their opposing motor rotation directions.

Example 3

Figure 5:
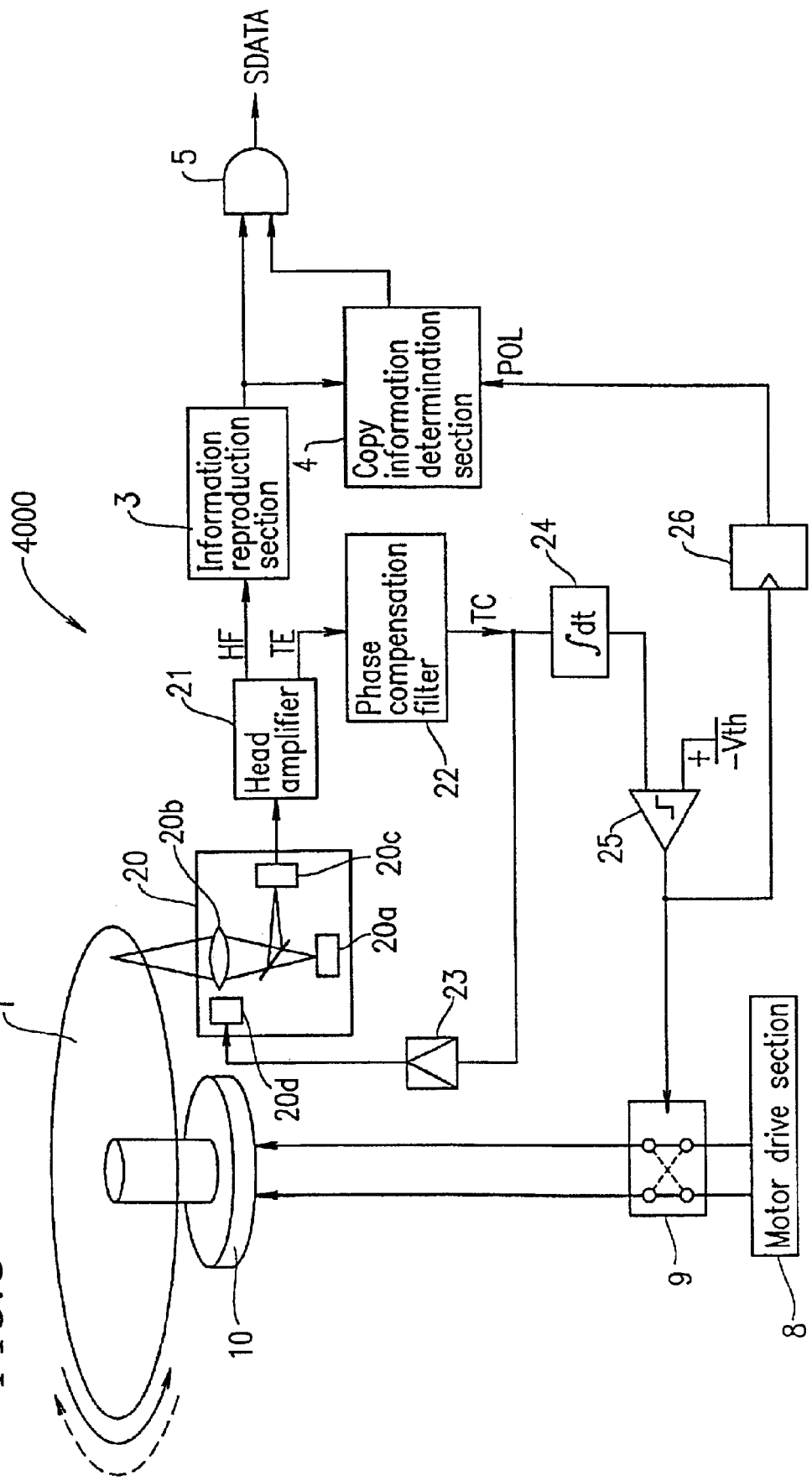
FIG. 5 is a block diagram of an optical disk apparatus according to Example 3 of the present invention.

FIG. 5 is a block diagram of an optical disk apparatus 4000 according to Example 3 of the present invention. In the optical disk apparatus 4000 shown in FIG. 5, components similar to those of the optical disk apparatus 3000 shown in FIG. 3 are denoted by similar reference numerals. Specifically, in the optical disk apparatus 4000, an optical disk medium 1, an information reproduction section 3, a copy information determination section 4, a gate 5, a motor drive section 8, a polarity switching section 9, and a disk motor 10 have the same function as their corresponding components of the optical disk apparatus 3009 shown in FIG. 3.

In the optical disk apparatus 4000, an optical head 20 includes an object lens 20b which focuses a laser beam emitted by a laser source 20a on the optical disk medium 1, and a photodetector 20a which transforms a reflection beam from the optical disk medium 1 into an electric signal group. A head amplifier 21 creates an information reproduction signal HF and a tracking error signal TE from the electric signal group. The tracking error signal TE is input to a phase compensation filter 22, and the phase compensation filter 22 outputs a tracking control signal TC. The tracking control signal TC is fed back through a drive amplifier 23 to a tracking actuator 20d of the optical head 20, thereby performing tracking control. Example 3 of the present invention is characterized in that the type of the optical disk medium 1 is identified by identifying a spiral direction of the optical disk medium 1 based on the tracking control signal TC.

With the above-described tracking control, the location of a focused laser beam with which the optical disk medium 1 is irradiated by the object lens 20b is controlled so as to follow a track formed on the optical disk medium 1. Where the optical disk medium 1 is rotated along a prescribed direction, the aforementioned focused laser beam moves toward an outer circumference or an inner circumference of the optical disk medium 1. Whether the focused laser beam moves toward the outer circumference or the inner circumference of the optical disk medium 1 depends on a spiral direction of the track on the optical disk medium 1. Thus, from a moving direction of the focused laser beam, which has been tracking controlled, the spiral direction of the optical disk medium 1 can be identified, thereby identifying the type of optical disk medium 1.

A specific example of methods for detecting the moving direction of the focused laser beam uses an optical element which detects displacement of the tracking actuator 20d. In Example 3 of the present invention, the polarity of an accumulated error of a tracking error signal is detected using an integrator circuit 24 and a comparator 25. A method for detecting the spiral direction of the optical disk medium 1 from the moving direction of the focused laser beam will be described with reference to FIG. 6A and a flowchart 4100 shown in FIG. 6B.

Figure 6B:
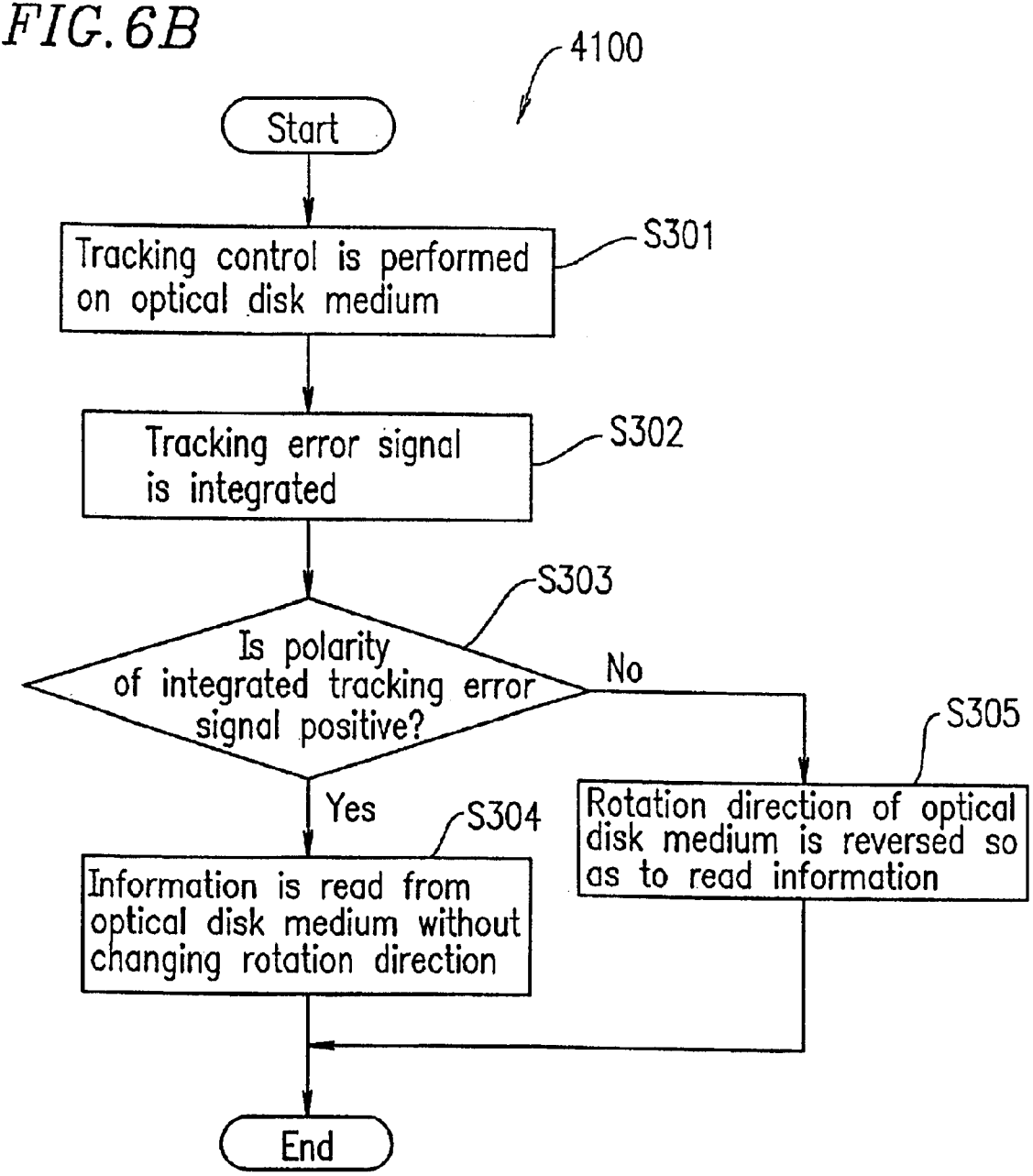
FIG. 6B is a flowchart illustrating a spiral direction detection method according to Example 3 of the present invention.

The aforementioned tracking control system is used for feeding back a detected tracking error signal to the tracking actuator 20d (step S301 shown in FIG. 6B). The detected tracking error signal is integrated (step S302), and the polarity of the integrated tracking error signal is identified (step S303). Although not shown in the figures, the tracking actuator 20d includes a movable element on which an object lens is mounted, and a fixed element to which an electromagnetic coil is provided. These two elements are joined by a weak elastic body (e.g., a spring), and thus the tracking actuator 20d has spring-mass system secondary integral characteristics. That is, the tracking actuator 20d has a character of being displaced by a distance corresponding to a value obtained by integrating the tracking error signal TE through the tracking control. In other words, the tracking actuator 20d has the ability to overpower reaction force of a spring using an integrated driving power. Thus, an integrated output by the integrator circuit 24 exactly corresponds to the displacement of the tracking actuator 20d.

FIG. 6A shows an example of variations in an integrated tracking error signal STE (i.e., the aforementioned integrated output) for each of the cases where the optical disk medium 1 is a reproduction-only type or a recordable type and a rotation direction of the optical disk medium 1 is prescribed.

In FIG. 6A, for example, when the tracking control is performed on the optical disk medium 1000 of a reproduction-only type as the optical disk medium 1, the tracking actuator 20d is displaced toward the outer circumference of the disk and the integrated tracking error signal STE varies in a positive direction. In this case, information is further read (step S304).

On the other hand, when reproducing information on the optical disk medium 2000 of a recordable type on which a spiral track is formed along a direction opposite the optical disk medium 1000, the tracking actuator 20d is displaced toward the inner circumference of the disk and the integrated tracking error signal STE varies in a negative direction. Thus, when it is possible to identify the polarity in which the integrated tracking error signal STE varies, a spiral direction of the optical disk medium 1, that is, the type of the disk can be identified.

In Example 3 of the present invention, as shown in FIG. 6A, a threshold −Vth is set on the negative side of an electric potential, and when the integrated tracking error signal STE falls below the threshold −Vth, the comparator 25 is operated, so that a latch 26 (FIG. 5) holds a signal from the comparator 25 and supplies a polarity switching signal POL to the polarity switching section 9 and the copy information determination section 4 (step S305 shown in FIG. 6B).

Moreover, after the type of the optical disk medium 1 has been identified in the above-described manner, illegal copy detection is performed in a manner as shown in FIG. 4D.

As described above, according to Example 3 of the present invention, the spiral direction of the optical disk medium 1 can be identified based on an amount of the integrated tracking error signal TE, thereby further identifying the type of the optical disk medium 1.

In the present invention, as described above, it is preferable that switching a rotation direction of an optical disk medium is automatically performed by an optical disk apparatus. However, a user of the optical disk apparatus may manually switch the rotation direction of the optical disk medium by operating the optical disk apparatus.

It should be noted that the present invention is applicable not only to an optical disk but also to recording media having any disk shape, such as a magneto-optical disk, a magnetic disk, etc.

INDUSTRIAL APPLICABILITY

As described above, according to the present invention, an optical disk of a reproduction-only type and an optical disk of a recordable type have the same format and each type of the disks includes a track thereon, which has a spiral direction opposite the other type of disk, whereby it is possible to readily identify both types of disks. It is also possible to identify whether or not information has been illegally recorded on an optical disk. These features allow copyright of information recorded on the disk to be properly protected.

What is claimed is:

1. A reproduction-only disk medium comprising preformed first information, wherein:
the first information is formed in the same format as second information recorded on a prescribed recordable disk medium; and
a direction along which the first information is formed on the reproduction-only disk medium is opposite to a direction along which the second information is recorded on the prescribed recordable disk medium.

2. A reproduction-only disk medium according to claim 1, wherein third information, which represents that the first information is illegal, is preformed.

3. A reproduction-only disk medium according to claim 1, wherein:
the first information is formed according to a prescribed modulation rule;
fourth information, which has a first mark having a code length other than that created according to the prescribed modulation rule, is preformed on the reproduction-only disk medium; and
a second mark and a third mark respectively having a different prescribed code length are formed so as to be adjacent the first mark.

4. A reproduction-only disk medium according to claim 1, wherein:
the first information is formed along a first spiral direction of a spiral first track on the reproduction-only disk medium; and the first spiral direction is opposite to a second spiral direction of a spiral second track on the prescribed recordable disk medium on which the second information is recorded.

5. A recordable disk medium on which first information is recorded, wherein:
the first information is recorded in the same format as second information preformed on a prescribed reproduction-only disk medium; and
a direction along which the first information is recorded on the recordable disk medium is opposite to a direction along which the second information is formed on the prescribed reproduction-only disk medium.

6. A recordable disk medium according to claim 5, comprising a region in which third information is recorded representing whether the first information is legal or illegal.

7. A recordable disk medium according to claim 5, wherein:
the first information is recorded according to a prescribed modulation rule;
fourth information, which has a first mark having a code length other than that created according to the prescribed modulation rule, is recorded on the recordable disk medium; and
a second mark and a third mark respectively having a different prescribed code length are recorded so as to be adjacent the first mark.

8. A recordable disk medium according to claim 5, wherein:
the first information is recorded along a first spiral direction of a spiral first track on the recordable disk medium; and
the first spiral direction is opposite to a second spiral direction of a spiral second track on the prescribed reproduction-only disk medium on which the second information is formed.

9. An optical disk apparatus reproducing at least first information or second information from a reproduction-only disk medium on which the first information is preformed or a recordable disk medium on which the second information is recorded, the optical disk apparatus comprising:
a motor for rotating the reproduction-only disk medium or the recordable disk medium; and a motor drive section for controlling the motor, wherein a rotation direction during reproduction of the reproduction-only disk medium is different from a rotation direction during reproduction of the recordable disk medium.

10. An optical disk apparatus according to claim 9, wherein:

a first spiral direction of a spiral first track on the reproduction-only disk medium on which the first information is formed is opposite to a second spiral direction of a spiral second track on the recordable disk medium on which the second information is recorded;

the optical disk apparatus further comprises a disk type identification section for identifying the reproduction-only disk medium and the recordable disk medium from the first spiral direction or the second spiral direction.

11. An optical disk apparatus according to claim 10, further comprising a rotation direction switching section for switching a rotation direction of the motor according to the first spiral direction or the second spiral direction.

12. An optical disk apparatus according to claim 10, wherein:

the reproduction-only disk medium includes preformed fourth information representing the first spiral direction;

the recordable disk medium includes preformed fifth information representing the second spiral direction; and a direction identification section identifies the first spiral direction and the second spiral direction based on the fourth information and the fifth information.

13. An optical disk apparatus according to claim 9, wherein:

the reproduction-only disk medium includes preformed third information which represents that the first information is illegal; and during reproduction of the reproduction-only disk medium, the third information is ignored by the optical disk apparatus.

14. A disk medium identification method for identifying a reproduction-only disk medium including a plurality of pits preformed along a first spiral direction of a spiral first track and a recordable disk medium on which information can be recorded along a second spiral direction of a spiral second track opposite to the first spiral direction, the method comprising the steps of:

performing tracking control by rotating a prescribed disk along a prescribed direction;

integrating a tracking error signal created when performing the tracking control; and identifying the reproduction-only disk medium and the recordable disk medium according to a polarity of the integrated tracking error signal.

15. A disk medium identification method for identifying a reproduction-only disk medium including a plurality of pits preformed along a first spiral direction of a spiral first track and a recordable disk medium on which information can be recorded along a second spiral direction of a spiral second track opposite to the first spiral direction, the method comprising the steps of:

detecting a first signal from a prescribed disk when the prescribed disk is rotated along a prescribed direction; and identifying the reproduction-only disk medium and the recordable disk medium based on the first signal.

16. A disk medium identification method according to claim 15, wherein the first signal includes at least a second signal having a first code length, a third signal having a second code length, and a fourth signal having a third code length, the code lengths being different from one another.

17. A disk medium identification method according to claim 16, identifying the reproduction-only disk medium and the recordable disk medium according to at least an order in which the second signal, the third signal, and the fourth signal are reproduced.

* * * * *